United States Patent Office 3,684,597
Patented Aug. 15, 1972

3,684,597
METHOD OF PRODUCING DENSE OXIDIZER SALT-FUEL COMPOSITION
Jack Robins, Allentown, and Harold B. Harris, Tamaqua, Pa., assignors to Atlas Chemical Industries, Inc., Wilmington, Del.
No Drawing. Filed July 25, 1969, Ser. No. 845,068
Int. Cl. C06b 1/04
U.S. Cl. 149—46
12 Claims

ABSTRACT OF THE DISCLOSURE

Dense explosive compositions containing an inorganic oxidizer salt, a liquid hydrocarbon fuel, and an oil-retaining surfactant, and methods of preparing them. The compositions are sufficiently dense so that a packing density significantly greater than one can be obtained.

---

This invention relates to dense explosive compositions containing surfactants and to methods of preparing them.

Ammonium nitrate-fuel oil (ANFO) compositions having densities greater than 1 can be prepared by techniques such as vibrating during packaging, but these techniques do not consistently produce densities greater than 1, and even the higher density compositions produced are not dense enough to sink in boreholes containing impure water. Still higher density compositions have been produced by pressing prills, but this is a costly method and these compositions are often insensitive.

We have discovered that certain surfactants when included in oxidizer-fuel explosive mixtures will produce a reproducibly dense composition. These compositions have signficantly higher densities than do similar compositions not containing the surfactant. When they are mixed with whole prills and packaged properly, the resulting densities of the packaged compositions are significantly greater than 1 and the compositions will sink in most boreholes even when impure water is present. Also, the surfactant raises the density level at which "dead-pressing" (i.e., lower velocities and energy) begins from about 1.1 to about 1.15.

The preferred compositions of this invention comprise about 78 to 97% (all percentages herein are by weight) inorganic oxidizer salt, about 2 to 12% liquid hydrocarbon fuel, and about 0.2 to 10% surfactant. The most preferred compositions comprise about 92 to 95½% inorganic oxidizer salt, about 4 to 6% liquid hydrocarbon fuel, and about 0.5 to 2% surfactant.

Examples of inorganic oxidizer salts include ammonium nitrate, which is preferred, other inorganic nitrates such as sodium nitrate, calcium nitrate, magnesium nitrate, potassium nitrate, lithium nitrate, and inorganic perchlorates such as ammonium perchlorate, potassium perchlorate, and sodium perchlorate. Minor amounts of inorganic chlorates such as ammonium chlorate, potassium chlorate, and sodium chlorate may also be used with caution. The inorganic oxidizer salt before crushing is substantially in the form of prills, granules, crystals, etc., and has a particle size greater than about 20 mesh; prills are preferred.

Examples of suitable liquid hydrocarbon fuels include the mineral fuel oils such as diesel fuel oil, kerosene, and benzene; diesel fuel oil is the preferred liquid hydrocarbon fuel.

The surfactants which have an effect on the density of oxidizer-fuel oil mixtures are cationic or nonionic, preferably nonionic, preferably liquids, and are "oil-retaining" and do not gel in the presence of fuel oil. By "oil-retaining" it is meant that the surfactant will increase the amount of oil retained by the inorganic oxidizer salt. Specifically, to determine if a surfactant is oil-retaining, a mixture of the oxidizer salt, fuel, and surfactant is prepared along with a control mixture of the same amounts of oxidizer salt and fuel but without the surfactant. Both are thoroughly stirred and the fuel is filtered off. The two mixtures are weighed and, if the mixture with the surfactant has retained more than 5% more fuel than the control, the surfactant is oil-retaining. A test may be conducted, for example, with 10 g. oxidizer salt prills, 7.2 gms. fuel, and 0.8 gm. surfactant. Stir one minute, filter, weigh, and compare to control.

The preferred surfactants are polyoxyethylene(5) nonyl phenol ($C_{25}H_{44}O_6$), polyoxyethylene(10)nonyl phenol ($C_{35}H_{64}O_{11}$), polyoxyethylene(10)oleyl ether ($C_{38}H_{76}O_{11}$), polyoxyethylene(20)sorbitan monopalmitate ($C_{62}H_{122}O_{26}$), polyoxyethylene(20)sorbitan monooleate ($C_{64}H_{124}O_{26}$), or mixtures thereof. These surfactants are "oil-retaining" as determined by the above test to the extent of 6, 8, 18, 7, and 6 percent, respectively, and are sold by Atlas Chemical Industries, Inc., under the trademarks "Renex 648," "Renex 690," "Brij 96," "Tween 40," and "Tween 80," respectively Polyoxyethylene(10)oleyl ether is the most preferred surfactant. The number in parentheses in the chemical names of the surfactants indicates the approximate number of oxyethylene groups and the empirical formula is based on this approximate number.

The compositions of this invention may optionally contain metals such as aluminum and its alloys, magnesium and its alloys, solid fuels such as sulfur, coal, charcoal, and other carbonaceous materials, explosive sensitizers such as DNT, TNT, tetryl, ethylene diamine dinitrate, and methyl amine nitrate and/or non-explosive sensitizers such as phenol or urea-formaldehyde resin spheres. In the event that optional components are included, the percentages given for the compositions of this invention are based on the total amount of oxidizer, fuel, and surfactant present.

The compositions of this invention may be made either by mixing the fuel and oxidizer, crushing, and mixing in the surfactant, or by mixing the fuel, oxidizer, and surfactant and crushing. In both cases, the oxidizer salt and the fuel are crushed together. The crushing in either case should be to such an extent that at least about 85% of the crushed material can pass through a U.S. #20 sieve.

A packaged explosive having densities significantly greater than 1 and greater than could be obtained without the presence of the surfactant can be prepared by mixing about 30 to 70% of a composition of this invention with about 30 to 70% of a mixture of uncrushed inorganic oxidizer salt and liquid hydrocarbon fuel, preferably diesel fuel oil, the proportion of oxidizer to fuel being chosen for oxygen balance, where "uncrushed" means over 20 mesh. The explosive is packaged using a density-increasing packaging technique such as vibration, auger-packing, or incremental packing, preferably vibration. In the vibration technique, the compositions may be placed into containers on a vibrating table vibrated at, for example, between 400 and 525 r.p.m. at an amplitude of about ¾ inches.

Various compositions were prepared by mixing ammonium nitrate prills, fuel oil, and a surfactant and crushing in a Gump roller mill set at 0.013 inch and having roller speeds of 120 and 236 r.p.m. The ammonium nitrate prills used in these examples had the following screen analysis: #6—100% passed, #10—10 to 20% retained, #14—60 to 70% retained, and #20—less than 1% passed. The following tables give the compositions, their cup density, and a crushed screen analysis. The oil was removed from the compositions with a solvent after crushing for the screen analysis. The tables show the increase in cup density which resulted from using the surfactant.

Cup density is determined by packing a cylinder, 5.85" long by 2.00" inside diameter, with the composition. 400 ml. of the composition which has passed through a No. 8 sieve is placed in the cylinder and a 16-pound plunger is gently placed on the composition for 30 seconds. The process is repeated with 100 ml. increments until the cylinder is filled, and the density of its contents is determined by weighing and dividing the result in grams by the volume of the cylinder in cc.

TABLE I
[Surfactant: Polyoxyethylene(10)nonyl phenol]

| Mix percentages: | | | |
|---|---|---|---|
| AN | 94.6 | 94.4 | 94.4 |
| FO | 5.4 | 5.1 | 5.6 |
| Surfactant | | 0.5 | |
| Total | 100.0 | 100.0 | 100.0 |
| Cup density, g./cc. | 0.81 | 0.84 | 0.81 |
| Screen analysis, percent by USS: | | | |
| #10 | 100.0 | 100.0 | 100.0 |
| #14 | 99.6 | 99.8 | 99.8 |
| #20 | 94.1 | 99.3 | 93.6 |

TABLE II
[Surfactant: Polyoxyethylene(10)oleyl ether]

| Mix percentages: | | | |
|---|---|---|---|
| AN | 94.6 | 94.4 | 94.4 |
| FO | 5.4 | 5.1 | 5.6 |
| Surfactant | | 0.5 | |
| Total | 100.0 | 100.0 | 100.0 |
| Cup density, g./cc. | 0.80 | 0.88 | 0.82 |
| Screen analysis, percent by USS: | | | |
| #10 | 100.0 | 100.0 | 100.0 |
| #14 | 100.0 | 100.0 | 99.8 |
| #20 | 99.7 | 99.7 | 97.4 |

TABLE III
[Surfactants: Polyoxyethylene (20) sorbitan monopalmitate—Column A; Polyoxyethylene (20) orbitan monooleate—Column B]

| | A | | B | |
|---|---|---|---|---|
| Mix percentage: | | | | |
| AN | 94.6 | 94.4 | 94.4 | 94.4 |
| FO | 5.4 | 5.1 | 5.1 | 5.6 |
| Surfactant | | 0.5 | 0.5 | |
| Total | 100.0 | 100.0 | 100.0 | 100.0 |
| Cup density, g./cc. | 0.82 | 0.87 | 0.91 | 0.82 |
| Screen analysis, percent by USS: | | | | |
| #10 | 100.0 | 100.0 | 100.0 | 100.0 |
| #14 | 99.8 | 99.7 | 99.8 | 99.9 |
| #20 | 97.7 | 97.99 | 98.1 | 98.0 |

TABLE IV
[Surfactant: Polyoxyethylene(5)nonyl phenol]

| Mix percentages: | | | |
|---|---|---|---|
| AN | 94.6 | 94.4 | 94.4 |
| FO | 5.4 | 5.1 | 5.6 |
| Surfactant | | 0.5 | |
| Total | 100.0 | 100.0 | 100.0 |
| Cup density, g./cc. | 0.80 | 0.88 | 0.80 |
| Screen analysis, percent by USS: | | | |
| #10 | 100.0 | 100.0 | 100.0 |
| #14 | 100.0 | 100.0 | 100.0 |
| #20 | 99.5 | 99.8 | 99.4 |

The following table illustrates the preparation of other compositions and shows the importance of crushing the fuel oil and the oxidizer together; note the much greater densities obtained in Cases B and D where the method of this invention was followed over Cases A, C, and E where it was not followed.

TABLE V
The Effect of Polyoxyethylene(5)nonyl phenol on Crushed Prill Properties

| | Sample Number | | | | |
|---|---|---|---|---|---|
| | A | B | C | D | E |
| Crush roll setting, in | 0.013 | | | | |
| Percent AN | 94.6 | 94.4 | 94.4 | 94.4 | 94.4 |
| Percent FO | 5.4 | 5.1 | 5.1 | 5.1 | 5.6 |
| Total | 100.0 | 100.0 | 100.0 | 100.0 | 100.0 |
| Percent polyoxyethylene (5) nonyl phenol | | 0.5 | 0.5 | 0.5 | |
| Cup density, g./cc. | 0.847 | 0.930 | 0.850 | 0.920 | 0.850 |
| Screen analysis, percent by USS: | | | | | |
| #10 | 100.0 | 100.0 | 100.0 | 100.0 | 100.0 |
| #14 | 99.2 | 99.5 | 100.0 | 99.9 | 99.0 |
| #20 | 96.9 | 95.5 | 100.0 | 97.3 | 97.6 |

NOTE.—Method of preparation: Samples A and E—Pre-oiled and crushed, no surfactant added; Sample B—Pre-oiled, surfactant added, then crushed; Sample C—Dry crushed, fuel oil and surfactant added later; Sample D—Pre-oiled and crushed, surfactant added later.

The following example illustrates the preparation of a packaged explosive. 94.4% ammonium nitrate, 5.1% diesel fuel oil, and 0.5% "Renex 648" were mixed together and crushed in a roller mill having a spacing of 0.013 inch between rolls and roller speeds of 590 and 300 r.p.m. until at least about 85% passed through a U.S. #20 sieve. A final mix was prepared with 45% of the above mixture and 55% of a mixture of 94.4% ammonium nitrate (uncrushed prills), 5.4% diesel fuel oil, and 0.2% "Renex 648" to minimize settling by conglomeration of prills. This final mix had a cup density of 1.04 g./cc. The final mix can be packaged in flexible bags or other containers by vibrating with a two-dimensional vibrator having a ¾" amplitude in both directions to result in a packaged density greater than 1.14. When the final mix was packaged in a 3¾" diameter flexible bag to form a package weighing 16⅔ lbs. by jolting vertically by hand, which is a rather inefficient density-increasing packaging technique, a packaged density of 1.14 nevertheless resulted. The packaged explosive was then detonated with a gelatin dynamite and had a measured steady detonation velocity of 10,840 ft./sec.

As a comparison, packaged explosives were prepared from 94.5% ammonium nitrate (uncrushed prills) and 5.5% diesel fuel oil. Prior to mixing the diesel fuel oil with the prills, 40 to 45% of the prills were crushed in a hammer mill until at least 85% passed through a #20 sieve. The oiled mixture had a cup density of 0.94 g./cc. It was packaged in a 3¾" diameter flexible bag to form a package weighing 16⅔ lbs. by jolting with a two-dimensional vibrator having a ¾" amplitude in both directions which, although it is an efficient density-increasing packaging technique, nevertheless resulted in densities of only 1.05 to 1.1. When fired, a steady-state detonation velocity of 10,300 ft./sec. was recorded.

What is claimed is:
1. A method for making a dense inorganic oxidizer salt-hydrocarbon fuel explosive composition comprising
   (a) mixing a liquid hydrocarbon fuel and an inorganic oxidizer salt having a particle size greater than about 20 mesh; and
   (b) performing the following steps in any sequence
      (1) crushing said mixture, and
      (2) mixing an oil-retaining polyoxyethylene surfactant into said mixture.
2. A method according to claim 1 wherein said mixture is crushed to such an extent that at least 85% of said crushed mixture can pass through a U.S. #20 sieve.
3. A method according to claim 2 wherein said surfactant is polyoxyethylene nonyl phenol having about 5 or about 10 oxyethylene groups, polyoxyethylene oleyl ether having about 10 oxyethylene groups, polyoxyethylene sorbitan monopalmitate having about 20 oxyethylene groups, polyoxyethylene sorbitan monooleate having about 20 oxyethylene groups, or mixtures thereof.
4. A method according to claim 2 wherein said inorganic oxidizer salt is ammonium nitrate.

5. A method for making a packaged explosive comprising mixing about 30 to 70% of the composition of claim 2 with about 30 to 70% of a mixture of liquid hydrocarbon fuel and uncrushed inorganic oxidizer salt, and packaging said mixture with a density-increasing packaging technique.

6. A method according to claim 5 wherein said technique is vibration.

7. A method according to claim 2 wherein said composition comprises about 92 to 95½% ammonium nitrate, about 4 to 6% diesel fuel oil, and about 0.5 to 2% cationic or nonionic oil-retaining polyoxyethylene liquid surfactant.

8. A method according to claim 7 wherein said surfactant is polyoxyethylene nonyl phenol having about 5 or about 10 oxyethylene groups, polyoxyethylene oleyl ether having about 10 oxyethylene groups, polyoxyethylene sorbitan monopalmitate having about 20 oxyethylene groups, polyoxyethylene sorbitan monooleate having about 20 oxyethylene groups, or mixtures thereof.

9. A method for making a packaged explosive comprising mixing about 30 to 70% of a composition according to claim 7 with about 30 to 70% of a mixture of diesel fuel oil and uncrushed ammonium nitrate, and packaging said mixture with a density-increasing packaging technique.

10. A method according to claim 9 wherein said technique is vibration.

11. A method of making a dense inorganic oxidizer salt-liquid hydrocarbon fuel explosive composition comprising mixing a liquid hydrocarbon fuel and an inorganic oxidizer salt having a particle size greater than about 20 mesh, crushing said mixture to such an extent that at least about 85% of said crushed mixture can pass through a U.S. #20 sieve, and making an oil-retaining polyoxyethylene surfactant into said crushed mixture.

12. A method of making a dense inorganic oxidizer salt-liquid hydrocarbon fuel explosive composition comprising mixing a liquid hydrocarbon fuel, an inorganic oxidizer salt having a particle size greater than about 20 mesh, and an oil-retaining polyoxyethylene surfactant together and crushing said mixture to such an extent that at least about 85% of said crushed mixture can pass through a U.S. #20 sieve.

References Cited
UNITED STATES PATENTS

| | | | |
|---|---|---|---|
| 3,103,457 | 9/1963 | Grossman | 149—46 |
| 3,111,437 | 11/1963 | Hino et al. | 149—46 |
| 3,129,128 | 4/1964 | Berczely | 149—46 |
| 3,161,551 | 12/1964 | Egly et al. | 149—46 |
| 3,164,503 | 1/1965 | Gehrig | 149—46 X |
| 3,281,292 | 10/1966 | Falconer et al. | 149—46 X |
| 3,402,065 | 9/1968 | McDonald et al. | 149—7 X |

CARL D. QUARFORTH, Primary Examiner

S. J. LECHERT, Jr., Assistant Examiner

U.S. Cl. X.R.

149—7, 109, 110, 112